Feb. 23, 1932.  O. W. ROBERTSON ET AL  1,846,456
PIPE FITTING
Filed Feb. 28, 1930
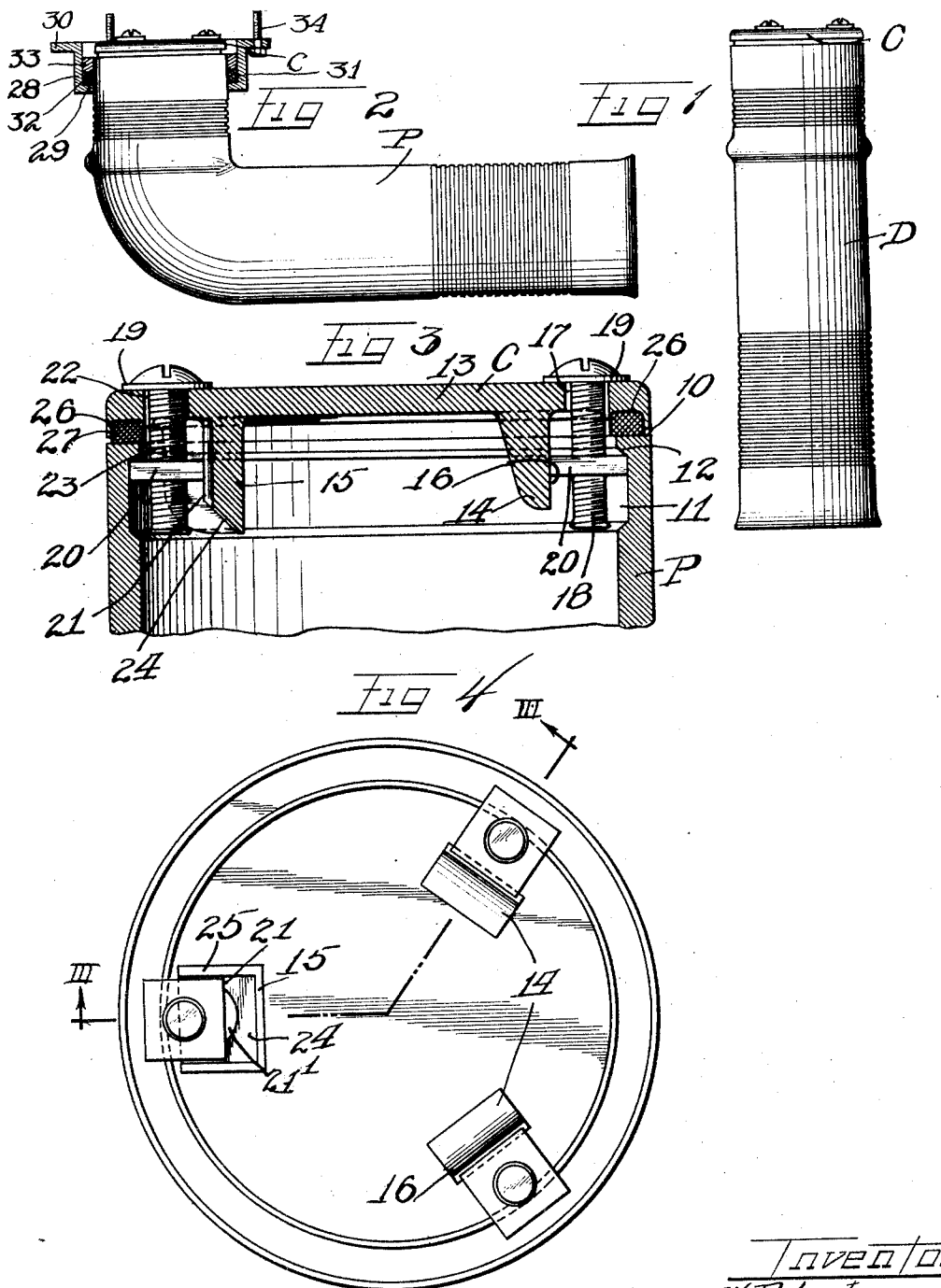
Inventors
Oscar W. Robertson
William J. Chalmers
by
Charles W. Jells Attys Patented Feb. 23, 1932

1,846,456

UNITED STATES PATENT OFFICE

OSCAR W. ROBERTSON AND WILLIAM P. CHALMERS, OF GADSDEN, ALABAMA, ASSIGNORS TO STRINGER BROTHERS COMPANY, INC., OF CHICAGO, ILLINOIS, A CORPORATION OF ILLINOIS

PIPE FITTING

Application filed February 28, 1930. Serial No. 432,029.

This invention relates to pipe fittings and particularly to improved construction and arrangement for applying a cover to the end of a soil pipe so that tests of the piping can be made and so that the pipe will be protected against the entrance of dirt until plumbing fixtures such as closet seats are applied to the piping.

An important object of the invention is to provide a simple inexpensive cover which may be a unitary casting and whose outer diameter is no greater than that of the terminal pipe to which it is to be applied.

Another important object is to provide simplified aligning and securing means entirely on the inside of the cover and pipe for detachably securing the cover accurately against the pipe end.

A further important object is to provide aligning and securing means operable entirely from the outside of the cover, as by a screw driver, for securing or detaching the cover.

A further object is to provide fastening means in the form of ordinary bolts, such as stove bolts, operable by a screw driver from the top of the cover and whose nuts cooperate with depending lugs on the cover and abutments on the inside of the pipe for automatically aligning the cover and rigidly clamping it against the end of the pipe when the bolts are turned.

A further object is to provide arrangement for permitting the cover to be primarily applied to the pipe end with the bolts supported by the cover, together with means controlled by the bolt nuts for aligning the cover as the bolts are turned to secure the cover.

The above and other features of our invention will be apparent from the following detail description and the drawings, on which drawings Figure 1 is a side elevation of a straight terminal pipe with our improved cover applied thereto;

Figure 2 is a side elevation of a pipe bend with the cover applied thereto;

Figure 3 is an enlarged diametral section on the line III—III of Figure 4 of the end of a pipe and the cover applied thereto; and Figure 4 is an underside view of the cover structure.

The pipe shown is cylindrical, its inlet end presenting preferably a flat annular seat 10. A short distance inwardly from the end the pipe has the annular groove 11 presenting the outer or abutment shoulder 12.

The cover structure C is preferably an integral casting and comprises the body 13 in the form of a flat circular disk, and abutment lugs 14 and 15 depending therefrom. Preferably two lugs 14 and one lug 15 are provided with the lugs spaced 120° apart. The lugs 14 have each an outer vertical face 16 the faces being radially equidistant from the center of the cover and the lugs depending to extend a short distance below the abutment shoulder 12 when the cover is on the pipe. Extending through the cover between each lug 14 and the outer edge of the cover is a bolt hole 17 for the passage of a bolt 18. Ordinary stove bolts may be used and preferably a washer 19 is placed under the head of each screw. The lower end of each screw 18 receives a square nut 20 for engaging between the outer face 16 of the lug 14 and the bottom of the grove 11. The axis of each bolt and its bolt hole is substantially midway between the lug face and the bottom of the groove and the bolt holes are preferably a trifle larger than the bolts so as to allow considerable play.

The lug 15 has the outer face 21 at right angles with the plane of the cover and the radial distance of this face from the center of the cover is the same as that for the faces 16 of the lugs 14. Between the lug 15 and the periphery of the cover is the bolt hole 22 for a bolt 23 which may be exactly like the bolts 18, a washer 19 being applied under the bolt head. The nut 20 for the bolt fits between the face 21 and the bottom of the groove 11 when the cover is in locked position on the pipe, the axis of the bolt and the hole 22 being substantially midway between the face and the groove bottom.

The face 21 extends a short distance below the shoulder 12 when the cover is in locking position and the lower end of the lug 15 is tapered to form the guide incline surface 24 for guiding the nut of the bolt 23 to the vertical surface 21. The lug 15 has preferably side flanges 25 which assist in guiding the nut and in holding it against rotation. The bolt hole 22 is larger than the bolt 23 to provide clearance and the face 22 may have the longitudinal groove 21′ therein so that the bolt 23 may swing a considerable distance radial inwardly when its nut is at the lower end thereof outside of the lug face 21.

The cover has preferably the annular groove 26 in its underside for holding a packing ring or gasket 27 which engages the seat end 10 of the pipe when the cover is applied.

Before the cover is applied to the pipe, the nuts on the bolts are brought down to the bolt ends to be just within the lower ends of the lugs and the bolt ends may be burred to prevent detachment of the nuts. The enlarged bolt hole 22, the groove 21′ and the beveled end of the lug 15 permit the bolt 23 to be inclined or swung inwardly sufficiently so that the nuts of all of the bolts will readily enter and pass through the pipe end above the groove 11. The screws can now be readily turned from the top of the cover, as by means of a screw driver, until the nuts reach the abutment shoulder 12 whereafter further turning of the bolts will cause the cover to be drawn down toward the pipe to compress the gasket and form a tight sealing fit and closure. When the bolt 23 is turned its nut will be drawn along the beveled surface 24, and after the nut 20 engages with the bottom of the groove 11 the engagement of the nut with the beveled surface as the cover is being drawn down will shift the cover radially until the nut reaches the vertical surface or face 21. Such shifting of the cover by the engagement of the nut 20 with the beveled surface will bring the cover into accurate alignment with the pipe end, and when the nuts are in engagement with the vertical surfaces, the bolts will be at right angles with the cover, and the abutment shoulder 12 is preferably inclined so that the pressure of the nuts thereagainst will tend to shift and hold the nuts against the lug faces. The distance between the lug faces and the bottom of the groove 11 will then be sufficiently greater than the width of the nuts to allow for irregularities in the pipe casting and thus prevent binding of the nuts and undue strain on the lugs.

The beveled end of the lug 15 serves two purposes, first, to permit sufficient swing of the bolt 23 so that all the bolts can readily be passed into the pipe, and, second, to guide the nut for the bolt 23 to the abutment shoulder 12 and then to shift the cover into accurate alignment and engagement on the pipe end. It is evident that the lugs 14 could also be beveled like the lug 15.

The cover, being of no greater diameter than the outside of the pipe to which it is applied, will not interfere with the proper setting of the pipe or with finish work around the pipe end. For example, we have shown a collar 28 receiving the end of the pipe P, this collar at its lower end having the internal flange 29 and at its outer end having the external flange 30. The collar is of greater diameter than the pipe to leave the packing space 31 for packing which may be oakum 32 and lead 33. The upper flange may have bolts 34 extending therefrom for securing to the flange devices such as closet seats.

As the cover C is of no greater diameter than the pipe end, the collar may be applied to the pipe end without removing the cover and this cover may therefore remain in place while the collar is being applied and protect the pipe end until the device, such as a closet seat, is to be applied.

The cover structure is a simple casting requiring no finishing work and it can therefore be cheaply manufactured. Ordinary bolts may be used which can be turned from the top of the cover with an ordinary screw driver, and when the cover has been applied, these bolts will be entirely within the pipe and will be protected from dirt, cement or other foreign matter so that when the cover is to be removed the bolts can be readily turned. All the pipe requires in order to receive the cover is the annular groove 11 on its inside, the outside of the pipe remaining entirely free of any obstruction. The annular groove 11 permits application of the cover in any circumferential position and the cover can therefore be quickly and readily applied without painstaking and time consuming aligning or fitting.

While we have described more or less precisely the details of construction of one practical application of our invention we do not limit ourselves thereto as changes and modifications in construction and arrangement are possible without departing from the scope and principles of the invention.

We claim as our invention:

1. In combination, a soil pipe having a cylindrical end with an internal annular shoulder at the entrance thereof, the inner surface of said pipe below said shoulder being cylindrical and coaxial with the pipe axis, a cover for engaging the pipe end, lugs extending inwardly from said cover each having an outer face parallel with said cylindrical surface below said shoulder, bolt holes through said cover midway between said lug surfaces and said cylindrical surface, a bolt extending through each bolt hole and having a nut thereon whose width is substantially the distance between said cylindrical surface and the opposed parallel faces of the respective lugs whereby when said bolts are turned the nuts thereof will be moved upwardly into abutting engagement with said shoulders to thereby lock the cover axially to the pipe end without exerting radial pressure thereon.

2. In combination, a soil pipe having a cylindrical end and an internal annular shoulder at the entrance thereof, the inner surface of said pipe below said shoulder being cylindrical and concentric with the pipe axis, a cover for the end of said pipe, lugs extending inwardly from said cover, the outer face of each lug being parallel with said cylindrical surface, a bolt hole through said cover outside of each of said lugs, a bolt extending inwardly through each bolt hole, a nut for each bolt, the width of each bolt being substantially the distance between said cylindrical surface and the opposed parallel face of the respective lugs, one of said lugs having a beveled inner end for permitting inward swing of the corresponding bolt when its nut is at the lower end thereof and whereby said bolts may then be inserted into the pipe end to apply the cover thereto, said beveled end serving also to guide the nut of the associated bolt into engagement with said cylindrical surface and the engagement of the bolt with said beveled end causing said cover to be accurately centered relative to the pipe end, said bolts when tightened causing the nuts to move upwardly between said cylindrical surface and the opposed parallel faces of the lugs and into abutting engagement with said shoulder to thereby lock the cover axially to the pipe end without subjecting the cover to radial pressure or strain.

In testimony whereof, we have hereunto subscribed our names at Gadsden, Etowah County, Alabama.

OSCAR W. ROBERTSON.
WILLIAM P. CHALMERS.